United States Patent
Lee et al.

(10) Patent No.: US 9,975,990 B2
(45) Date of Patent: May 22, 2018

(54) ALIPHATIC POLYCARBONATE WITH LONG-CHAIN BRANCHES AND AROMATIC COPOLYESTER THEREOF

(71) Applicant: LOTTE CHEMICAL CORPORATION, Seoul (KR)

(72) Inventors: Bun Yeoul Lee, Suwon (KR); Jung Jae Lee, Suwon (KR); Eun Yeong Hwang, Suwon (KR); Jong Yeob Jeon, Hongseong (KR); Seong Chan Eo, Seongnam (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days. days.

(21) Appl. No.: 15/028,860

(22) PCT Filed: Oct. 29, 2014

(86) PCT No.: PCT/KR2014/010267
§ 371 (c)(1),
(2) Date: Apr. 12, 2016

(87) PCT Pub. No.: WO2015/065050
PCT Pub. Date: May 7, 2015

(65) Prior Publication Data
US 2016/0251475 A1    Sep. 1, 2016

(30) Foreign Application Priority Data

Oct. 30, 2013 (KR) .................. 10-2013-0129810

(51) Int. Cl.
| | | |
|---|---|---|
| *C08G 63/64* | (2006.01) | |
| *C08G 64/02* | (2006.01) | |
| *C08G 64/16* | (2006.01) | |
| *C08G 63/83* | (2006.01) | |
| *C08G 64/30* | (2006.01) | |

(52) U.S. Cl.
CPC ............. *C08G 63/64* (2013.01); *C08G 63/83* (2013.01); *C08G 64/02* (2013.01); *C08G 64/0208* (2013.01); *C08G 64/0241* (2013.01); *C08G 64/1608* (2013.01); *C08G 64/305* (2013.01)

(58) Field of Classification Search
None
See application file for complete search history.

(56) References Cited

U.S. PATENT DOCUMENTS

| 4,855,377 A * | 8/1989 | Yokota .................. C08G 18/44 528/25 |
| 5,171,830 A | 12/1992 | Grey |
| 2002/0155515 A1 | 10/2002 | Farina et al. |
| 2007/0166199 A1 | 7/2007 | Zhou et al. |
| 2011/0184143 A1 * | 7/2011 | Helou .................. C08G 64/305 528/128 |
| 2012/0003732 A1 | 1/2012 | Hung et al. |
| 2012/0009671 A1 | 1/2012 | Hansen |
| 2012/0156410 A1 * | 6/2012 | Allen ..................... B32B 27/36 428/35.7 |
| 2013/0059322 A1 | 3/2013 | Hung et al. |

FOREIGN PATENT DOCUMENTS

| AU | 722763 B2 | 8/2000 |
| CN | 1678729 A | 10/2005 |
| CN | 1904620 A | 1/2007 |
| CN | 101285807 A | 10/2008 |
| CN | 101506656 A | 8/2009 |
| CN | 101541962 A | 9/2009 |
| CN | 101981455 A | 2/2011 |
| CN | 102947710 A | 2/2013 |
| EP | 0 302 712 | 11/1996 |
| EP | 0 798 328 A2 | 10/1997 |
| EP | 1 874 846 B1 | 6/2011 |
| JP | 04007327 * | 1/1992 |
| JP | 10087799 * | 4/1998 |
| JP | 3033778 B2 | 4/2000 |
| JP | 2009210392 A | 9/2009 |
| JP | 2009-235291 A | 10/2009 |
| KR | 20070033685 A | 3/2007 |
| KR | 10-2011-0030660 A | 3/2011 |
| WO | WO2009024595 A2 | 2/2009 |

(Continued)

OTHER PUBLICATIONS

Zhu et al., "Synthesis, Characterization and Degradation of Novel Biodegradable Poly(butylene-co-hexamethylene Biodegradable Poly(butylene-co-hexamethylene". Journal of Macromolecular Science, Part A: Pure and Applied Chemistry (2011) 48, pp. 583-594.
Chum et al., "Materials Properties Derived from INSITE Metallocene Catalysts". Adv. Mater. 2000, 12, No. 23, Dec. 1, pp. 1759-1767.
Langston et al., "One-Pot Process of Preparing Long Chain Branched Polypropylene Using C2-Symmetric Metallocene Complex and a "T" Reagent". Macromolecules, vol. 38, No. 14, 2005, pp. 5849-5853.
Zhu et al., "High-molecular-weight aliphatic polycarbonates by melt polycondensation of dimethyl carbonate and aliphatic diols: synthesis and characterization". Polym Int 2011; 60: pp. 1060-1067.
Naik et al., "Organo-catalyzed synthesis of aliphatic polycarbonates in solvent-free conditions". Polym. Chem., 2012, 3, pp. 1475-1480.
Pokharkar et al., "Poly(alkylene carbonate)s by the carbonate interchange reaction of aliphatic diols with dimethyl carbonate: synthesis and characterization". Polymer vol. 36, No. 25, pp. 4851-4854, 1995.

(Continued)

*Primary Examiner* — David J Buttner
(74) *Attorney, Agent, or Firm* — STIP Law Group, LLC

(57) ABSTRACT

Provided is an aliphatic polycarbonate-co-aromatic polyester with long-chain branches. The copolymer includes repeating units represented by —OAO— and $Z(O-)_a$, which are linked via carbonyl (—C(O)—) and —C(O)YC(O)— as linkers. Also provided is an aliphatic copolycarbonate including repeating units represented by —OAO— and $Z(O-)_a$, which are linked via carbonyl (—C(O)—) linkers. The aliphatic copolycarbonate has a weight average molecular weight of 30,000 or more.

5 Claims, 1 Drawing Sheet

(56) References Cited

FOREIGN PATENT DOCUMENTS

| WO | WO2011081434 A2 | 7/2011 |
|---|---|---|
| WO | 2012-019979 A2 | 2/2012 |
| WO | WO2013038925 A1 | 3/2013 |

OTHER PUBLICATIONS

International Search Report for PCT/KR2014/010267 dated Feb. 16, 2015.
M-H. Wu et al.; Microfluidic cell culture systems for drug research; Lab Chip; 2010; vol. 10, pp. 939-956; The Royal Society of Chemistry; UK.
D.H.Pincus; Microbial Identification using the Biomerieux Vitek 2 System; Encyclopedia of Rapid Microbiological Methods; Jan. 2005; pp. 1-32; www.pda.org/bookstore.

\* cited by examiner

[Fig. 1]
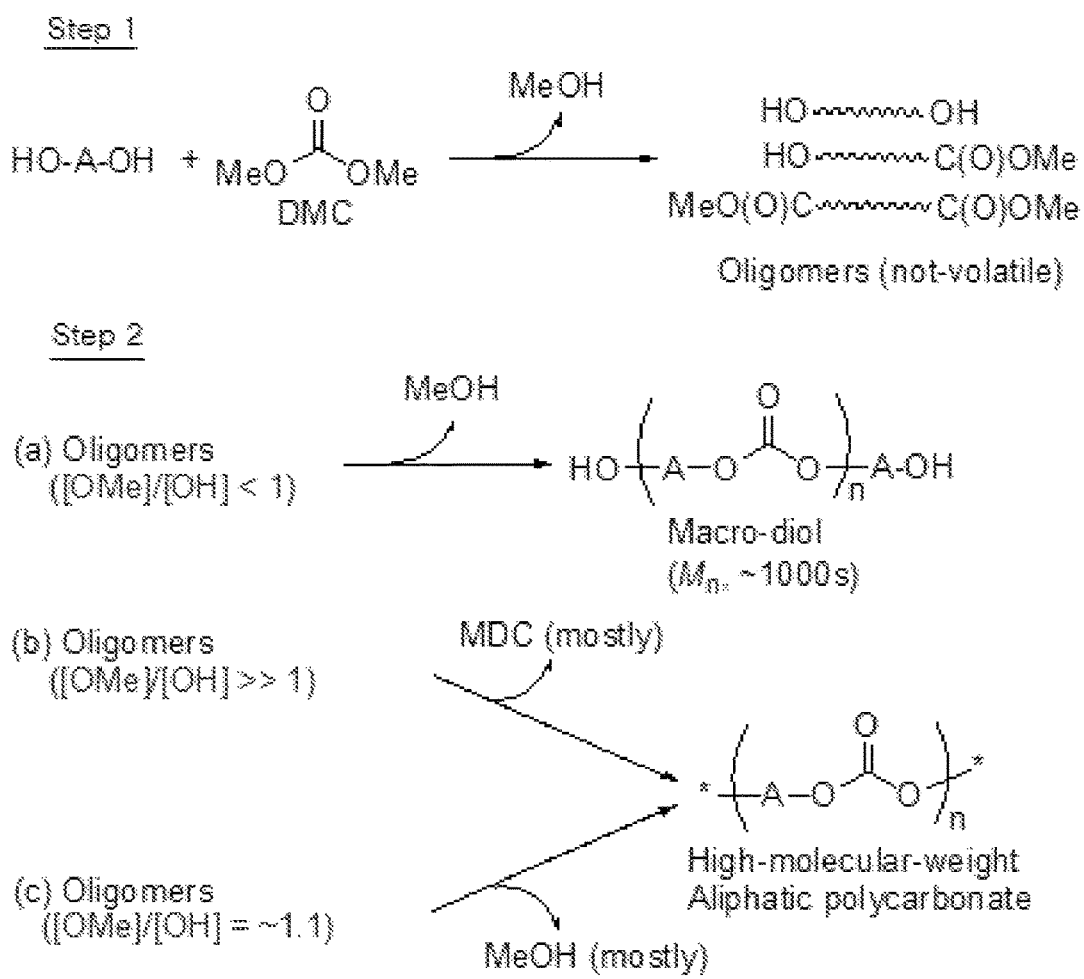

ALIPHATIC POLYCARBONATE WITH LONG-CHAIN BRANCHES AND AROMATIC COPOLYESTER THEREOF

CROSS-REFERENCE TO RELATED APPLICATIONS

This application is the U.S. National Phase under 35 U.S.C. § 371 of International Application No. PCT/KR2014/010267 filed on Oct. 29, 2014, which in turn claims the benefit of Korean Application No. 10-2013-0129810, filed on Oct. 30, 2013, the disclosures of which are incorporated by reference into the present application.

TECHNICAL FIELD

The present disclosure relates to a novel structure of an aliphatic polycarbonate with long-chain branches, an aromatic copolyester of the aliphatic polycarbonate, and methods for preparing the polymers.

BACKGROUND ART

Aliphatic polycarbonates are biodegradable eco-friendly polymers. The most appropriate method for mass production of aliphatic polycarbonates is associated with the condensation of dimethyl carbonate (DMC) and various diols (Reaction 1).

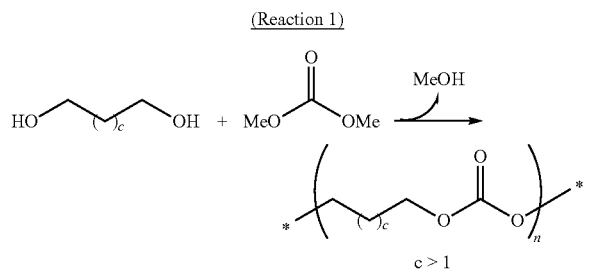

(Reaction 1)

DMC has been produced for long time from toxic phosgene. DMC is currently mass-produced at low cost from carbon monoxide or more environmentally friendly carbon dioxide. There are many reports in the literature on the condensation reactions of DMC and diols. However, these reactions are typically slow and have a limitation in increasing the molecular weight of the final polymers. Instead, oligomeric macrodiols whose molecular weight is several thousands and whose ends are all capped with —OH are prepared from DMC and diols, and most of them are used for polyurethane production (EP 302712; EP1874846).

Most efforts to prepare high molecular weight aliphatic polycarbonates have not been successful. Sivaram et al. reported the preparation of aliphatic polycarbonates having a weight average molecular weight of 6,000 to 25,000 by condensation of DMC with various diols using 1,3-diphenoxytetra-n-butyldistannoxane as a catalyst (Polymer Vol. 36, 4851-4854, 1995). U.S. Pat. No. 5,171,830 discloses a process for the preparation of aliphatic polycarbonates including condensing DMC with various diols using a tertiary amine or alkylammonium salt as a catalyst. However, the molecular weights of the polymers prepared by this process are only on the order of 2,400. According to a recent report, an attempt has been made to synthesize aliphatic polycarbonates by condensation of various diols and DMC using 1-n-butyl-3-methylimidazolium-2-carboxylate (1 mol %) as a catalyst. However, the aliphatic polycarbonates have number average molecular weights not higher than 6,700 (*Polym. Chem.*, 2012, 3, 1475). Chuncheng Li only reported the preparation of an aliphatic polycarbonate with a weight average molecular weight of 100,000 or more by condensation of DMC and 1,4-butanediol using a $TiO_2/SiO_2/poly$(vinyl pyrrolidone) mixture as a solid catalyst (*Polym Int* 2011; 60: 1060-1067; *Journal of Macromolecular Science, Part A: Pure and Applied Chemistry* (2011) 48, 583-594). That is, attempts to prepare high molecular weight aliphatic polycarbonates suitable for use as general-purpose biodegradable plastics are still in the early stages.

Techniques for introducing long-chain branches into polymer chains are of importance in general-purpose plastics, such as polyethylene. The introduction of long-chain branches offers the potential to increase melt-fracture resistance and impart shear-thinning behavior in terms of rheology, ensuring high processability in various applications, such as blown films, cast films, injection molding, blow molding, and thermoforming (*Adv. Mater.*, 2000, 12, 1759; *Macromolecules*, 2005, 38, 5849).

DETAILED DESCRIPTION OF THE INVENTION

Problems to be Solved by the Invention

A first object of the present invention is to provide an aliphatic polycarbonate with long-chain branches.

A second object of the present invention is to provide an aliphatic polycarbonate-co-aromatic polyester with long-chain branches.

A third object of the present invention is to provide a method for preparing an aliphatic polycarbonate with long-chain branches.

A fourth object of the present invention is to provide a method for preparing an aliphatic polycarbonate-co-aromatic polyester with long-chain branches.

Means for Solving the Problems

One aspect of the present invention provides an aliphatic polycarbonate-co-aromatic polyester including repeating units represented by —OAO— and $Z(O-)_a$ linked via carbonyl (—C(O)—) and —C(O)YC(O)— as linkers wherein A is selected from substituted or unsubstituted $C_3$-$C_{60}$ alkylene groups and combinations thereof, a is an integer equal to or greater than 3, Z is an a-valent substituted or unsubstituted $C_4$-$C_{60}$ radical, and Y is selected from substituted or unsubstituted $C_5$-$C_{20}$ arylenes, substituted or unsubstituted $C_5$-$C_{20}$ heteroarylenes, and combinations thereof.

In one embodiment, the aliphatic polycarbonate-co-aromatic polyester may have a weight average molecular weight of 80,000 or more and a molecular weight distribution ($M_w/M_n$) of 2.0 or more.

The term "alkyl" used herein is intended to include straight chained, branched, and cyclic hydrocarbon radicals. The term "alkylene" refers to a divalent radical derived from alkyl. For example, the alkylene includes methylene, ethylene, isobutylene, cyclohexylene, cyclopentylethylene, 2-prophenylene, and 3-butynylene. The alkylene may be interrupted by —O— or phenylene in the main chain. The term "substituted" in the expression of "substituted or unsubstituted" described herein means that one or more hydrogen atoms in the hydrocarbon are each independently replaced by the same or different substituents. Suitable substituents include, but are not limited to, —$R^a$, -halo, —$O^-$, =O, —$OR^b$, —$SR^b$, —$S^-$, =S, —$NR^cR^c$, =$NR^b$, =N—$OR^b$, trihalomethyl, —$CF_3$, —CN, —OCN, —SCN, —NO, —$NO_2$, =$N_2$, —$N_3$, —$S(O)_2R^b$, —$S(O)_2NR^b$, —$S(O)_2O^-$, —$S(O)_2OR^b$, —$OS(O)_2R^b$, —$OS(O)_2O^-$, —$OS(O)_2OR^b$, —$P(O)(O^-)_2$, —$P(O)(OR^b)(O^-)$, —$P(O)(OR^b)(OR^b)$, —$C(O)R^b$, —$C(S)R^b$, —$C(NR^b)R^b$, —$C(O)O^-$, —$C(O)OR^b$, —$C(S)OR^b$, —$C(O)NR^cR^c$, —$C(NR^b)NR^cR^c$, —$OC(O)R^b$, —$OC(S)R^b$, —$OC(O)O^-$, —$OC(O)OR^b$, —$OC(S)OR^b$, —$NR^bC(O)R^b$, —$NR^bC(S)R^b$, —$NR^bC(O)O^-$, —$NR^bC(O)OR^b$, —$NR^bC(S)OR^b$, —$NR^bC(O)NR^cR^c$, —$NR^bC(NR^b)R^b$, and —$NR^bC(NR^b)NR^cR^c$, where $R^a$ is selected from the group consisting of alkyl, cycloalkyl, heteroalkyl, cycloheteroalkyl, aryl, arylalkyl, heteroaryl, and heteroarylalkyl groups; each $R^b$ is independently hydrogen or $R^a$; each $R^c$ is independently $R^b$, with the proviso that the two $R^c$ groups, together with the nitrogen atom to which they are attached, may form a 4-, 5-, 6- or 7-membered cycloheteroalkyl and may optionally include 1 to 4 identical or different additional heteroatoms selected from the group consisting of O, N, and S. As a specific example, —$NR^cR^c$ is meant to include —$NH_2$, —NH-alkyl, N-pyrrolidinyl, and N-morpholinyl. As another example, the substituted alkyl is meant to include -alkylene-O-alkyl, -alkylene-heteroaryl, -alkylene-cycloheteroalkyl, -alkylene-C(O)$OR^b$, -alkylene-C(O)$NR^bR^b$, and —$CH_2$—$CH_2$—C(O)—$CH_3$. The one or more substituents, together with the atoms to which they are attached, may optionally form cyclic rings including cycloalkyl and cycloheteroalkyl.

The aliphatic polycarbonate-co-aromatic polyester in which —OAO— moieties as repeating units are randomly linked via carbonyl (—C(O)—) and —C(O)YC(O)— as linkers, and its preparation method by condensation of HO-A-OH, MeOC(O)YC(O)OMe, and DMC have never been, to our knowledge, reported before. During the condensation, a polyol compound represented by $Z(OH)_a$ (where a is an integer of 3 or greater) is further added to form polymer chains having long-chain branches. By the introduction of the long-chain branches, improved melt-fracture resistance and shear-thinning in terms of rheology can be expected, and as a result, an improvement in processability can be expected. The condensation with the $Z(OH)_a$ (where a is an integer of 3 or greater) ensures a high molecular weight and a broad molecular weight distribution ($M_w/M_n$) of the polymer. As described in the Examples section that follows, condensation of HO-A-OH, MeOC(O)YC(O)OMe, and DMC without the addition of $Z(OH)_a$ (where a is an integer of 3 or greater) afforded a polymer having a weight average molecular weight of 108000 and a molecular weight distribution ($M_w/M_n$) of 1.7 (Comparative Example 1), whereas further condensation with $Z(OH)_a$ (where a is an integer of 3 or greater) afforded a polymer having a higher weight average molecular weight of 190000 without being cross-linked and a broader molecular weight distribution of 4.30 (Example 3). The fact is generally known that a broad molecular weight distribution of a polymer leads to both high processability and excellent physical properties of the polymer. Due to the fact, development of techniques for the preparation of polymers, such as polyethylene, with a broad molecular weight distribution is a major issue.

Specifically, HOAOH as a raw material of the repeating units —OAO— is selected from the group consisting of the compounds of Formulae 1a to 1h:

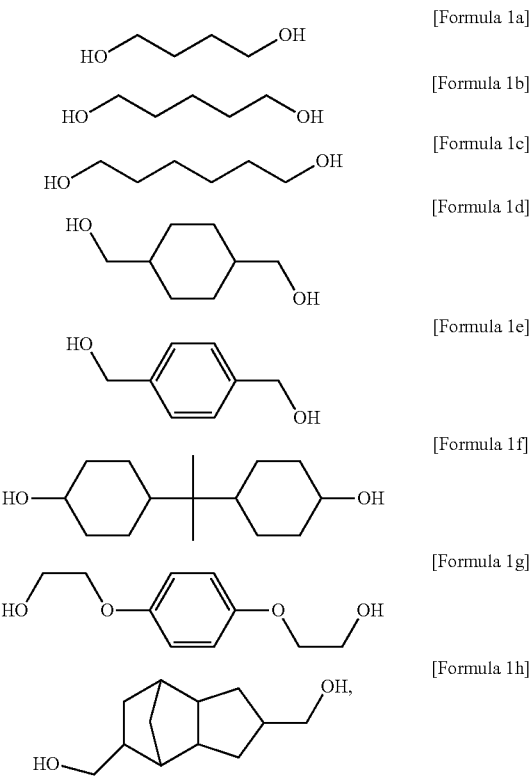

[Formula 1a]
[Formula 1b]
[Formula 1c]
[Formula 1d]
[Formula 1e]
[Formula 1f]
[Formula 1g]
[Formula 1h]

$Z(OH)_a$ as a raw material of the repeating units $Z(O-)_a$ is selected from the group consisting of the compounds of Formulae 2a to 2d:

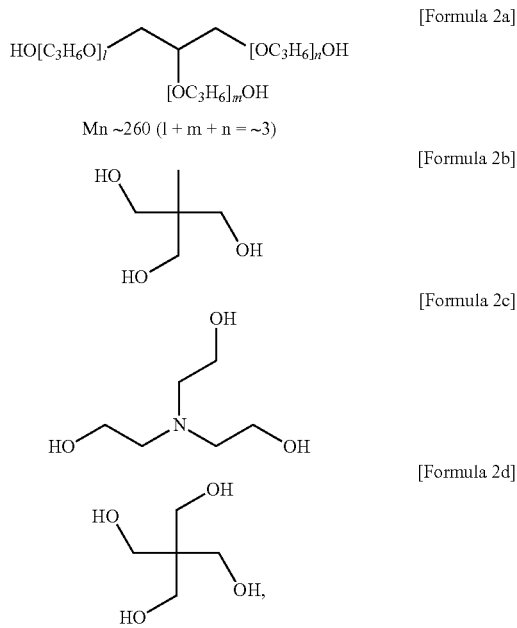

[Formula 2a]

Mn ~260 (l + m + n = ~3)

[Formula 2b]

[Formula 2c]

[Formula 2d]

and

HOC(O)YC(O)OH as a raw material of the linkers —C(O)YC(O)— is selected from the group consisting of phthalic acid, isophthalic acid, and terephthalic acid.

The compounds of Formulae 1a to 1h and 2a to 2d, phthalic acid, isophthalic acid, and terephthalic acid are currently produced and used on a large scale for industrial applications.

Particularly, the compound of Formula 1a, i.e. 1,4-butanediol, is currently mass-produced at a reduced cost. In recent years, commercial processes for the production of 1,4-butanediol from coal have been established and processes for the production of 1,4-butanediol by fermentation of biomass have been under active development. Accordingly, polymers produced from 1,4-butanediol as a raw material are considered very attractive. The HOC(O)YC(O)OH as a raw material of the linkers —C(O)YC(O)— may be terephthalic acid. This case has the advantage that the polymer is crystalline.

When the linkers —C(O)YC(O)— derived from terephthalic acid are present in an amount of 30 to 50 mol %, based on the moles of the repeating units —OAO—, the polymer has a melting point of 95 to 146° C., which is similar to that of polyethylene. This is advantageous in developing the use of the polymer. When the repeating units $Z(O—)_a$ are present in an amount of 0.1 to 0.5 mol %, based on the moles of the repeating units —OAO—, the polymer is less likely to gel despite its high number average molecular weight ($\geq$70,000). Gelation of the polymer may cause problems during processing.

A further aspect of the present invention provides an aliphatic copolycarbonate including repeating units represented by —OAO— and $Z(O—)_a$ linked via carbonyl (—C(O)—) linkers and having a weight average molecular weight of 30,000 or more. In the repeating units, A, Z, and a are as defined above.

In one embodiment, the aliphatic copolycarbonate may have a weight average molecular weight of 50,000 or more and a molecular weight distribution ($M_w/M_n$) of 2.0 or more.

EP0302712B1 discloses the preparation of an aliphatic polycarbonate by further adding $Z(OH)_3$, for example, the compound of Formula 2b, during condensation of a diol and DMC. Further, EP 798,328 discloses the preparation of an aliphatic polycarbonate by further addition of $Z(OH)_3$, for example, the compound of Formula 2a. These polycarbonates are viscous macropolyols with a molecular weight of several thousands as raw materials for polyurethane production and are distinguished from the aliphatic polycarbonate with a weight average molecular weight of 30,000 or more claimed in the present invention.

FIG. 1 shows conventional strategies for the preparation of aliphatic polycarbonates. The above patents took the strategy (a) shown FIG. 1 to prepare a viscous macropolyol with a molecular weight of several thousands as a raw material for polyurethane production. According to the strategy (a), oligomers containing excess —OH terminal groups are prepared in step 1 and are condensed while removing methanol under reduced pressure at high temperature to prepare a macropolyol whose ends are all capped with —OH and whose molecular weight is several thousands. However, it has not been reported that this strategy is successful in preparing a polymer having a weight average molecular weight of 30,000 or more. After complete removal of methanol, the condensation is continued while further removing the HOAOH, resulting in a further increase in the molecular weight of the polymer. At this time, the reaction rate is slow and the HOAOH is not easy to remove in the presence of excess —OH groups. That is, the strategy (a) leads to the preparation of a branched aliphatic polycarbonate having $Z(O—)_a$ units whose molecular weights is limited to a few thousands.

Generally, the strategy (b) shown in FIG. 1 was taken to prepare a high molecular weight polymer. Specifically, according to the strategy (b), oligomers containing excess —C(O)OCH$_3$ terminal groups are prepared in step 1 and the oligomers are condensed while removing DMC under reduced pressure at high temperature to prepare a high molecular weight polymer. However, attempts based on this strategy failed to prepare polymers with a weight average molecular weight of 30,000 or more because the condensation rate is very slow during DMC removal in a state in which the molecular weight increases to some extent. Based on the strategy (b), Chuncheng Li reported successful preparation of an aliphatic polycarbonate having a weight average molecular weight of 100,000 or more by condensation of DMC and 1,4-butanediol using a TiO$_2$/SiO$_2$/poly(vinyl pyrrolidone) mixture as a solid catalyst but did not try to introduce long-chain branches by further addition of a compound represented by $Z(OH)_a$.

The present invention is based on the use of a simple base catalyst for the preparation of the high molecular weight aliphatic polycarbonate. Specifically, the present invention takes the strategy (c) shown in FIG. 1. According to the strategy (c), a diol monomer is completely dehydrated, and oligomers containing —OH and —OCH$_3$ in a ratio of ~1:1 are prepared and condensed under reduced pressure at high temperature (step 2). Under these conditions, the reaction rate can be greatly enhanced. As a result, the desired aliphatic polycarbonate with a high molecular weight can be prepared using a small amount of a base catalyst in a short reaction time. This strategy enables the preparation of the aliphatic polycarbonate having a weight average molecular weight of 30,000 or more in a short time. At this time, further addition of a compound represented by $Z(OH)_a$ allows the aliphatic polycarbonate to have long-chain branches. By the introduction of the long-chain branches, improved melt-fracture resistance and shear-thinning in terms of rheology can be expected, and as a result, an improvement in processability can be expected. The condensation with $Z(OH)_a$ (where a is an integer of 3 or greater) ensures a high molecular weight and a broad molecular weight distribution ($M_w/M_n$) of the polymer. As described in the Examples section that follows, condensation of HO-A-OH and DMC without the addition of $Z(OH)_a$ (where a is an integer of 3 or greater) afforded a polymer having a weight average molecular weight of 146000 and a molecular weight distribution ($M_w/M_n$) of 1.5 (Comparative Example 2), whereas further condensation with $Z(OH)_a$ (where a is an integer of 3 or greater) afforded a polymer having a higher weight average molecular weight of 263000 without being cross-linked and a broader molecular weight distribution ($M_w/M_n$) of 4.7 (Example 14). The fact is generally known that a broad molecular weight distribution of a polymer leads to both high processability and excellent physical properties of the polymer. Due to the fact, development of techniques for the preparation of polymers, such as polyethylene, with a broad molecular weight distribution is a major issue.

HOAOH as a raw material of the repeating units —OAO— is selected from the group consisting of the compounds of Formulae 1a to 1h and $Z(OH)_a$ as a raw material of the repeating units $Z(O—)_a$ is selected from the group consisting of the compounds of Formulae 2a to 2d. The use of these raw materials is preferred because they are commercially available in large quantities.

Particularly, when the HOAOH as a raw material of the repeating units —OAO— is 1,4-butanediol of Formula 1a, the resulting polymer is crystalline and is also attractive in that 1,4-butanediol is currently produced on an industrial scale.

The amount of the $Z(O-)_a$ is preferably in the range of 0.1 to 0.4 mol %, based on the moles of the repeating units —OAO—. Within this range, no gelation occurs.

Another aspect of the present invention provides a method for preparing the aliphatic polycarbonate-co-aromatic polyester with long-chain branches. Specifically, the method includes condensing a mixture of HO-A-OH, $Z(OH)_a$, dimethyl carbonate, and MeOC(O)YC(O)OMe in the presence of a base catalyst while removing by-produced methanol by heating to or above the boiling point of the dimethyl carbonate (step 1) and reacting the reaction mixture of step 1 while distilling off volatiles by distillation under reduced pressure (step 2). The method is characterized in that the molar ratio of the alkoxy groups to the hydroxyl groups in the oligomers prepared in step 1 is controlled to 1:1-1.3. In the raw materials, A, Z, and Y are as defined above. When the molar ratio is controlled to 1:1-1.3, the condensation proceeds while removing by-products (mostly methanol) and methanol is removed relatively rapidly even in a state in which the conversion is considerably high, allowing the polymer to have a high molecular weight. The condensation of the aliphatic diol (HO-A-OH) and the polyol $Z(OH)_a$ with dimethyl carbonate and the MeOC(O)YC(O)OMe is a new reaction that has not been reported to date.

The base catalyst consists of a lithium, sodium or potassium cation and an alkoxy anion formed by deprotonation of the HOAOH, which is advantageous from an economic viewpoint. The base catalyst is preferably used in an amount of 0.01 mol % to 0.5 mol %, based on the moles of the HOAOH. The use of the catalyst in an amount larger than 0.5 mol % may be disadvantageous in increasing the molecular weight of the polymer, may cause the catalyst to precipitate as the reaction proceeds, and may affect the physical properties of the final polymer. Meanwhile, the use of the catalyst in an amount of less than 0.01 mol % may lead to an extremely low reaction rate, making it difficult to obtain a high molecular weight of the polymer. The use of a small amount of the catalyst avoids the need to remove the catalyst remaining after the reaction. The catalyst used in the present invention and the catalyst present in the final polymer are salts consisting of an alkali cation and alkoxy anions of the terminal groups. The base catalyst may also be used without removal or neutralization. Preferably, the base catalyst is neutralized by the addition of an equivalent amount of a melamine phenylphosphonate or acyl halide.

Preferably, the HOAOH is selected from the group consisting of the compounds of Formulae 1a to 1h, the $Z(OH)_a$ is selected from the group consisting of the compounds of Formulae 2a to 2d, and the HOC(O)YC(O)OH is selected from phthalic acid, isophthalic acid, and terephthalic acid. These compounds are widely used in industrial applications and are available at low prices.

The present invention also provides a method for preparing an aliphatic polycarbonate, including condensing HO-A-OH, $Z(OH)_a$, and dimethyl carbonate in the presence of a base catalyst while removing by-produced methanol by heating to or above the boiling point of the dimethyl carbonate (step 1) and reacting the reaction mixture of step 1 while distilling off volatiles by distillation under reduced pressure (step 2) wherein the molar ratio of the alkoxy groups to the hydroxyl groups in the reaction mixture of step 1 is controlled to 1:1-1.3. In the raw materials, A and Z are as defined above.

The present invention features that the molar ratio of the alkoxy groups to the hydroxyl groups in the oligomers prepared in step 1 is controlled to 1:1-1.3. Specifically, according to the strategy (c) shown in FIG. 1, the diol monomer is completely dehydrated and oligomers containing —OH and —OCH$_3$ in a ratio of ~1:1 are prepared and condensed under reduced pressure at high temperature (step 2). Under these conditions, the reaction rate can be greatly enhanced. As a result, a high molecular weight aliphatic polycarbonate can be prepared using a small amount of a base catalyst in a short reaction time. A general method for preparing a high molecular weight aliphatic polycarbonate is based on the strategy (b) shown in FIG. 1. According to the strategy (b), oligomers containing excess —OCH$_3$ terminal groups are prepared in step 1 and the oligomers are condensed while removing DMC under reduced pressure at high temperature. However, attempts based on this strategy failed to prepare polymers having a weight average molecular weight of 30,000 or more because the condensation rate is very slow during DMC removal in a state in which the molecular weight increases to some extent. Under the conditions specified in the present invention, the condensation proceeds while removing by-products (mostly methanol), facilitating the preparation of a high molecular weight polymer. However, there is no report regarding the preparation of a high molecular weight aliphatic polycarbonate with long-chain branches by further addition of $Z(OH)_a$ under the specified conditions. On the other hand, EP0302712B1 and EP 0798328 reported methods for preparing aliphatic polycarbonates by condensation of HO-A-OH, $Z(OH)_a$, and dimethyl carbonate. According to these methods, the molar ratio of the alkoxy groups to the hydroxyl groups in the oligomers prepared in step 1 is controlled to ≤1:1. The resulting polymers are macropolyols whose molecular weights are several thousands and whose ends are all capped with —OH. The method of the present invention is different from the conventional methods in view of its object. The method of the present invention is distinguished from the conventional methods in that the molar ratio of the alkoxy groups to the hydroxyl groups in the oligomers prepared in step 1 is controlled to 1:1-1.3.

The base catalyst consists of a lithium, sodium or potassium cation and an alkoxy anion formed by deprotonation of the HOAOH. For the above-described reasons, it is preferred to use the base catalyst in an amount of 0.01 mol % to 0.5 mol %, based on the moles of the HOAOH. The HOAOH is selected from the group consisting of the compounds of Formulae 1a to 1h and the $Z(OH)_a$ is selected from the group consisting of the compounds of Formulae 2a to 2d. The use of these raw materials is preferred for the same reasons as described above.

Effects of the Invention

The aliphatic polycarbonate and its aromatic copolyester of the present invention have long-chain branches. The introduction of the long-chain branches increases the molecular weights of the polymers, facilitates the preparation of the polymers, and broadens the molecular weight distributions of the polymers. In addition, the introduction of the long-chain branches offers the potential to increase melt-fracture resistance and impart shear-thinning behavior in terms of rheology, ensuring high processability in various applications, such as blown films, cast films, injection molding, blow molding, and thermoforming.

BRIEF DESCRIPTION OF THE DRAWINGS

FIG. 1 shows conventional strategies for the preparation of aliphatic polycarbonates.

MODE FOR CARRYING OUT THE INVENTION

The effects of the present invention will be explained in detail with reference to the following examples, including comparative examples. However, these examples are provided for illustrative purposes only and are not intended to limit the scope of the invention.

Examples 1-11

Preparation of Aliphatic Polycarbonate-co-aromatic Polyesters Having Long-chain Branches (Condensation Reactions of the Compound of Formulae 1a and the Compounds of 2a to 2d with DMC and Dimethyl Terephthalate)

Step 1: 1,4-butanediol (Formula 1a, 10.0 g, 110 mmol) and each of the compounds of Formulae 2a to 2d were placed in a three-neck flask and NaOH (0.222 mmol, 0.2 mol %) was added thereto. The compounds of Formulae 2a to 2d were used in amounts of 0.2-0.7 mol %, as shown in Table 1. After further addition of toluene (10 ml), a mechanical stirrer was connected to one neck of the flask, a manifold attached with a vacuum line and a nitrogen line was connected to another neck of the flask, and a Dean-Stark trap was connected to the remaining neck of the flask. After the reaction flask was immersed in a thermostatic bath, water was removed from the mixture by azeotropic distillation with the toluene under reflux. After 2 h, the mixture was allowed to cool to room temperature and remaining toluene was then removed under vacuum. The Dean-Stark trap was removed, and instead, a distillation unit was connected to the flask. 9.30 g (103 mmol) of dimethyl carbonate (DMC) and 8.62 g (44 mmol) of dimethyl terephthalate derived from terephthalic acid were added. After the reaction flask was immersed in a thermostatic bath at 120° C., the reaction was carried out for 1 h while distilling off formed methanol and a portion of the DMC at ambient pressure. After heating to 190° C., the reaction was continued while removing volatiles under a reduced pressure of 570 mmHg for 0.5 h, under a reduced pressure 380 mmHg for 1 h, and under a reduced pressure 190 mmHg for 2 h. Thereafter, the reaction was continued at 210° C. for additional 2 h while removing volatiles under a high vacuum of 0.3 mmHg, which was maintained using a vacuum pump. The experimental results are summarized in Table 1.

TABLE 1

<Preparation of aliphatic polycarbonate-co-aromatic polyesters having long-chain branches>

| | $Z(OH)_a$/amount (mol %) based on BD | Yield[a] (%) | $M_w$[b] | $M_w/M_n$[b] | $T_m$[c] (° C.) | Gel proportion[d] (%) |
|---|---|---|---|---|---|---|
| Example 1 | Formula 2a/0.25 | 91 | 118000 | 2.34 | 38-140 (48, 112) | — |
| Example 2 | Formula 2a/0.40 | 91 | 201000 | 3.72 | 39-140 (49, 112) | — |
| Example 3 | Formula 2a/0.50 | 91 | 190000 | 4.30 | 39-137 (48, 111) | — |
| Example 4 | Formula 2a/0.60 | 92 | 209000 | 5.51 | 39-138 (53, 113) | 33 |
| Example 5 | Formula 2a/0.70 | 91 | 123000 | 3.61 | 35-141 (50, 114) | 54 |
| Example 6 | Formula 2b/0.20 | 90 | 140000 | 3.00 | 40-140 (48, 112) | — |
| Example 7 | Formula 2c/0.20 | 92 | 116000 | 2.44 | 38-140 (48, 114) | — |
| Example 8 | Formula 2d/0.20 | 90 | 174000 | 3.45 | 43-142 (53, 114) | — |
| Example 9 | Formula 2d/0.30 | 91 | 213000 | 5.03 | 47-138 (55, 110) | 23 |
| Example 10 | Formula 2d/0.40 | 93 | 216000 | 5.21 | 31-137 (41, 114) | 17 |
| Example 11 | Formula 2d/0.50 | 90 | 129000 | 3.89 | 41-139 (48, 112) | 62 |

[a]Value calculated from the mass of the obtained polymer relative to the mass of 1,4-butanediol added.
[b]Value measured on the basis of polystyrene standard in THF at 40° C. by GPC.
[c]Melting point measured by DSC,
[d]Proportion of the mass of gel in the mass of the obtained polymer.

Comparative Example 1

Preparation of Aliphatic Polycarbonate-co-aromatic Polyester without Using $Z(OH)_a$ The procedure of Examples 1-11 was repeated except that none of the $Z(OH)_a$ compounds (Formulae 2a to 2d) were added. Yield=90%, $M_w$=108000, $M_w/M_n$=1.69, $T_m$=121° C.

Examples 12-20

Preparation of Aliphatic Polycarbonates Having Long-chain Branches (Condensation Reactions of the Compound of Formula 1a, the Compounds of Formulae 2a to 2d with DMC)

Step 1: The procedure of Examples 1-11 was repeated until water was removed from the mixture. Thereafter, the addition of dimethyl terephthalate was omitted, and instead, the amount of DMC was increased to 15.7 g (174 mmol). After the reaction flask was immersed in a thermostatic bath at 120° C., the reaction was carried out for 1 h while distilling off formed methanol and a portion of the DMC at ambient pressure. After heating to 190° C., the reaction was continued while removing volatiles under a reduced pressure of 570 mmHg for 0.5 h, under a reduced pressure 380 mmHg for 1 h, and under a reduced pressure 190 mmHg for 2 h. Thereafter, the reaction was continued for additional 2 h while removing volatiles under a high vacuum of 0.3 mmHg, which was maintained using a vacuum pump. The experimental results are summarized in Table 2.

TABLE 2

<Preparation of aliphatic polycarbonates having long-chain branches>

| | $Z(OH)_2$/amount (mol %) based on BD | Yield$^a$ (%) | $M_w^b$ | $M_w/M_n^b$ | $T_m^c$ (° C.) | Gel proportion$^d$ (%) |
|---|---|---|---|---|---|---|
| Example 12 | Formula 2a/0.20 | 85 | 243000 | 3.62 | 41-61 (54) | — |
| Example 13 | Formula 2a/0.30 | 90 | 203000 | 3.67 | 41-63 (57) | |
| Example 14 | Formula 2a/0.40 | 90 | 263000 | 4.70 | 41-61 (55) | 3.8 |
| Example 15 | Formula 2a/0.50 | 92 | 246000 | 4.87 | 41-61 (55) | 17 |
| Example 16 | Formula 2a/0.60 | 89 | 235000 | 4.68 | 40-60 (55) | 47 |
| Example 17 | Formula 2d/0.20 | 91 | 218000 | 4.13 | 41-62 (56) | — |
| Example 18 | Formula 2d/0.30 | 88 | 249000 | 4.60 | 40-60 (55) | 67 |
| Example 19 | Formula 2d/0.40 | 88 | 183000 | 4.03 | 41-62 (57) | 36 |
| Example 20 | Formula 2d/0.50 | 86 | 161000 | 4.91 | 42-62 (57) | 38 |

$^a$Value calculated from the mass of the obtained polymer relative to the mass of 1,4-butanediol added.
$^b$Value measured on the basis of polystyrene standard in THF at 40° C. by GPC.
$^c$Melting point measured by DSC.
$^d$Proportion of the mass of gel in the mass of the obtained polymer.

Comparative Example 2

Preparation of Aliphatic Polycarbonate without Using $Z(OH)_a$

The procedure of Examples 12-20 was repeated except that none of the $Z(OH)_a$ compounds (Formulae 2a to 2d) were added. Yield=90%, $M_w$=146000, $M_w/M_n$=1.53.

From the above results, the aliphatic polycarbonates and their aromatic copolyesters prepared by further condensation with the polyol compounds in Examples 1-20 had long-chain branches, high molecular weights, and broad molecular weight distributions compared to the polymers prepared in Comparative Examples 1 and 2.

The invention claimed is:

1. An aliphatic polycarbonate comprising repeating units represented by —OAO— and $Z(O—)_a$ linked via carbonyl (—C(O)—) linkers and having a weight average molecular weight of 30,000 or more wherein A is selected from substituted or unsubstituted $C_3$-$C_{60}$ alkylene groups and combinations thereof, a is an integer equal to or greater than 3, and Z is an a-valent substituted or unsubstituted $C_4$-$C_{60}$ radical, and wherein HOAOH as a raw material of the repeating units —OAO— is selected from the group consisting of the compounds of Formulae 1a to 1h:

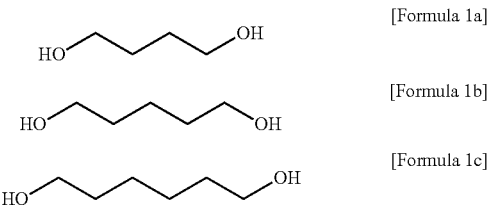

[Formula 1a]

[Formula 1b]

[Formula 1c]

-continued

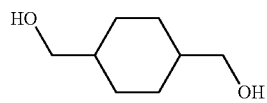

[Formula 1d]

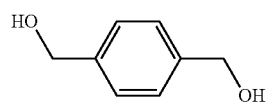

[Formula 1e]

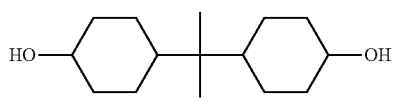

[Formula 1f]

-continued

[Formula 1g]

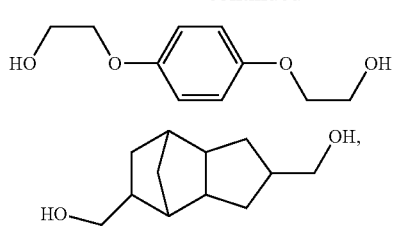

[Formula 1h]

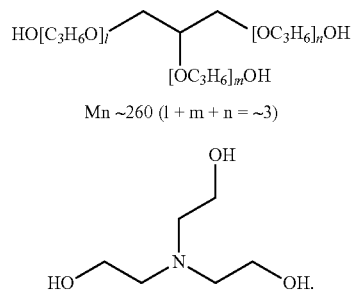

and
Z(OH)$_a$ as a raw material of the repeating units Z(O—)$_a$ is selected from the group consisting of the compounds of Formulae 2a or 2c:

[Formula 2a]

HO[C$_3$H$_6$O]$_l$ ~~~~ [OC$_3$H$_6$]$_n$OH
          [OC$_3$H$_6$]$_m$OH

Mn ~260 (l + m + n = ~3)

[Formula 2c]

```
         OH
         |
HO    N    OH
```

2. The aliphatic polycarbonate according to claim 1, wherein HOAOH as a raw material of the repeating units —OAO— is the compound of Formula 1a:

[Formula 1a]

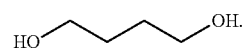

3. The aliphatic polycarbonate according to claim 2, wherein the amount of the Z(O—)$_a$ is from 0.1 to 0.4 mol %, based on the moles of the repeating units —OAO—.

4. The aliphatic polycarbonate according to claim 1, wherein the linkers further comprise —C(O)YC(O)— and Y is selected from substituted or unsubstituted C$_5$-C$_{20}$ arylenes, substituted or unsubstituted C$_5$-C$_{20}$ heteroarylenes, and combinations thereof.

5. The aliphatic polycarbonate according to claim 1, wherein the aliphatic polycarbonate is prepared in the presence of a base catalyst, and wherein the base catalyst consists of a lithium, sodium, or potassium cation and an alkoxy anion formed by deprotonation of the HOAOH.

* * * * *